United States Patent Office 2,931,836
Patented Apr. 5, 1960

2,931,836
PROCESS FOR AROMATIC ALKYNYL ETHERS

Margaret D. Cameron, Dayton, Ohio, assignor to Monsanto Chemical Company, St. Louis, Mo., a corporation of Delaware No Drawing. Application September 18, 1956
Serial No. 610,670

3 Claims. (Cl. 260—612)

This invention relates to a new process for the manufacture of aromatic propargyl ethers.

An object of this invention is the provision of a process for the aqueous alkynylation of phenols. The invention more particularly provides a process whereby aromatic alkynyl ethers are prepared by the addition of propargyl aromatic sulfonates to phenols in the presence of a base in aqueous solution. The following equation illustrates the general reaction:

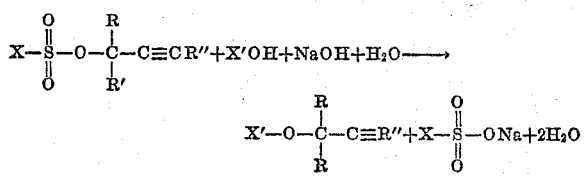

wherein X and X' are aromatic radicals such as the phenyl, chlorophenyl, tolyl or xylyl radicals, while R, R' and R'' are selected from the group consisting of hydrogen and hydrocarbon radicals having from 1 to 12 carbon atoms, and the total of R+R'+R'' is less than 25. The said hydrocarbon radicals may be saturated or unsaturated, including olefinic or acetylenic unsaturation.

It is an advantage of the present process that the formation of the aromatic alkynyl ethers may be carried out in aqueous solution, thereby obviating the necessity for the use of expensive organic solvents. Inasmuch as the aromatic propargyl ethers of the present invention are substantially insoluble in water, it is also an advantage of the present process that the product may be readily and completely separated from the reaction mixture.

In carrying out the above reaction the propargyl aromatic sulfonate and the phenolic compound such as phenol, cresol, naphthol, etc. may be utilized in stoichiometric proportions, although an excess of either proportion is practical. It is generally desirable to employ an excess of the phenol in order to achieve the maximum yield from the relatively expensive propargyl aromatic sulfonate. The reaction is carried out in the presence of a base, such as a basic alkali, for example, sodium hydroxide or potassium hydroxide, although inorganic carbonates and organic amines, such as $\beta$-(p-1,1,3,3-tetramethylbutyl-$\beta$-phenoxyethoxy)-ethyl dimethyl benzyl ammonium chloride may similarly be employed in this relationship. The proportion of the basic compound employed should be in at least stoichiometric relationship with the sulfonate in order to form the corresponding aromatic sulfonate. However, an excess of the base is generally preferable in order to assure completion of the reaction. The proportion of water is not critical in the present invention, and the use of a large excess of water is permissible. However, it is preferred to have at least 50% of the reaction mixture consist of water.

The propargyl aromatic sulfonates employed as the starting material are in general the benzene or para-toluene sulfonates of $\alpha,\beta$-acetylenic alcohols.

The present reaction may be carried out at temperatures above 40° C., a preferred temperature range being from 40° C. to 150° C. The pressure is not critical and may be the autogenous pressure or elevated pressures if desired.

The aromatic alkynyl ethers of the present invention are readily converted by prolonged refluxing to alkyl benzofurans which are useful as polymerizable monomers. For example, phenyl propargyl ether is thus converted to 2-methyl benzofuran. This monomer may be polymerized, or copolymerized with other polymerizable monomers to obtain a variety of useful polymeric materials. The ethers prepared by the present invention may also be utilized in the preparation of a wide variety of agricultural and industrial chemicals.

The following examples illustrate specific embodiments of the invention:

Example 1

Nineteen and six-tenths grams of propargyl benzene sulfonate was mixed with 9.4 g. of phenol which had been dissolved in 50 cc. of 10% aqueous sodium hydroxide. The entire reaction mixture was heated in a 100 ml. flask on a steam bath for 15 minutes in order to raise the temperature to approximately 40° C. The mixture was cooled and then extracted three times with 100 ml. portions of ether. The combined extracts were washed with 50 ml. of 5% NaOH and distilled. The fraction boiling at 83–85° C. was composed substantially entirely of phenyl propargyl ether. The phenyl propargyl ether has a refractive index of $n_D^{25}$ 1.5331.

Example 2

Eighteen and eight-tenths grams of phenol were dissolved in 80 ml. of 10% aqueous sodium hydroxide in a 100 ml. flask. To this solution then was added 43 g. of propargyl p-toluene-sulfonate after which the reaction mixture was heated about 100° C. on a steam bath for 2 hours. The mixture was then cooled, and was extracted three times with ethyl ether. The product as shown by infra-red absorption data was phenyl propargyl ether, boiling point 73–75° C. at 5 mm., refractive index $n_D^{25}$ 1.5375.

What is claimed is:

1. The method which comprises contacting an $\alpha,\beta$-acetylenic aromatic sulfonate with a phenol and a base in aqueous solution at a temperature above 40° C., and isolating from the resulting reaction mixture an aromatic alkylnyl ether.

2. The method which comprises contacting a propargyl aromatic sulfonate with a phenol and a base in stoichiometric proportion in aqueous solution at a temperature above 40° C., and isolating from the resulting reaction mixture a phenyl propargyl ether.

3. The method which comprises contacting propargyl benzene sulfonate with a stoichiometric proportion of phenol and sodium hydroxide in aqueous solution at a temperature above 40° C., and isolating from the resulting reaction mixture phenyl propargyl ether.

References Cited in the file of this patent

UNITED STATES PATENTS 2,695,920     Wilkinson et al.     Nov. 30, 1954
2,813,862     Arens     Nov. 19, 1957

(Other references on following page)

OTHER REFERENCES

Rodionow: Bulletin Societe Chimique de France, 4th series, vol. 45, part I, page 118 (1929).

Moncrieff: The Chemistry of Perfumery Materials, p. 154 (1949), publisher United Trade Press Ltd.

Shirley et al.: Jour. Amer. Chem. Soc., vol. 73 (1951), pages 458–59 (2 pages).

Wagner and Zook: Synthetic Organic Chemistry, 1953, page 229.

Cologne et al.: Bull. Soc. Chim. France, 1954, p. 981–2 (2 pages).

Cologne et al.: Chem. Abstracts, vol. 49 (1955), col. 8797–98.

Reppe: Liebig's Annalen der Chemie, vol. 596 (1955), page 75.